Dec. 24, 1963 A. ROTHBART 3,115,618

SIGNAL STORAGE SYSTEM

Filed Dec. 11, 1959 2 Sheets-Sheet 1

INVENTOR.
ARTHUR ROTHBART
BY Alfred C. Hill
AGENT

Dec. 24, 1963 A. ROTHBART 3,115,618

SIGNAL STORAGE SYSTEM

Filed Dec. 11, 1959 2 Sheets-Sheet 2

INVENTOR.
ARTHUR ROTHBART

BY Alfred C. Hill

AGENT

United States Patent Office 3,115,618
Patented Dec. 24, 1963

3,115,618
SIGNAL STORAGE SYSTEM

Arthur Rothbart, Bronx, N.Y., assignor to International Telephone and Telegraph Corporation, Nutley, N.J., a corporation of Maryland Filed Dec. 11, 1959, Ser. No. 858,936
16 Claims. (Cl. 340—173)

Figure 1:
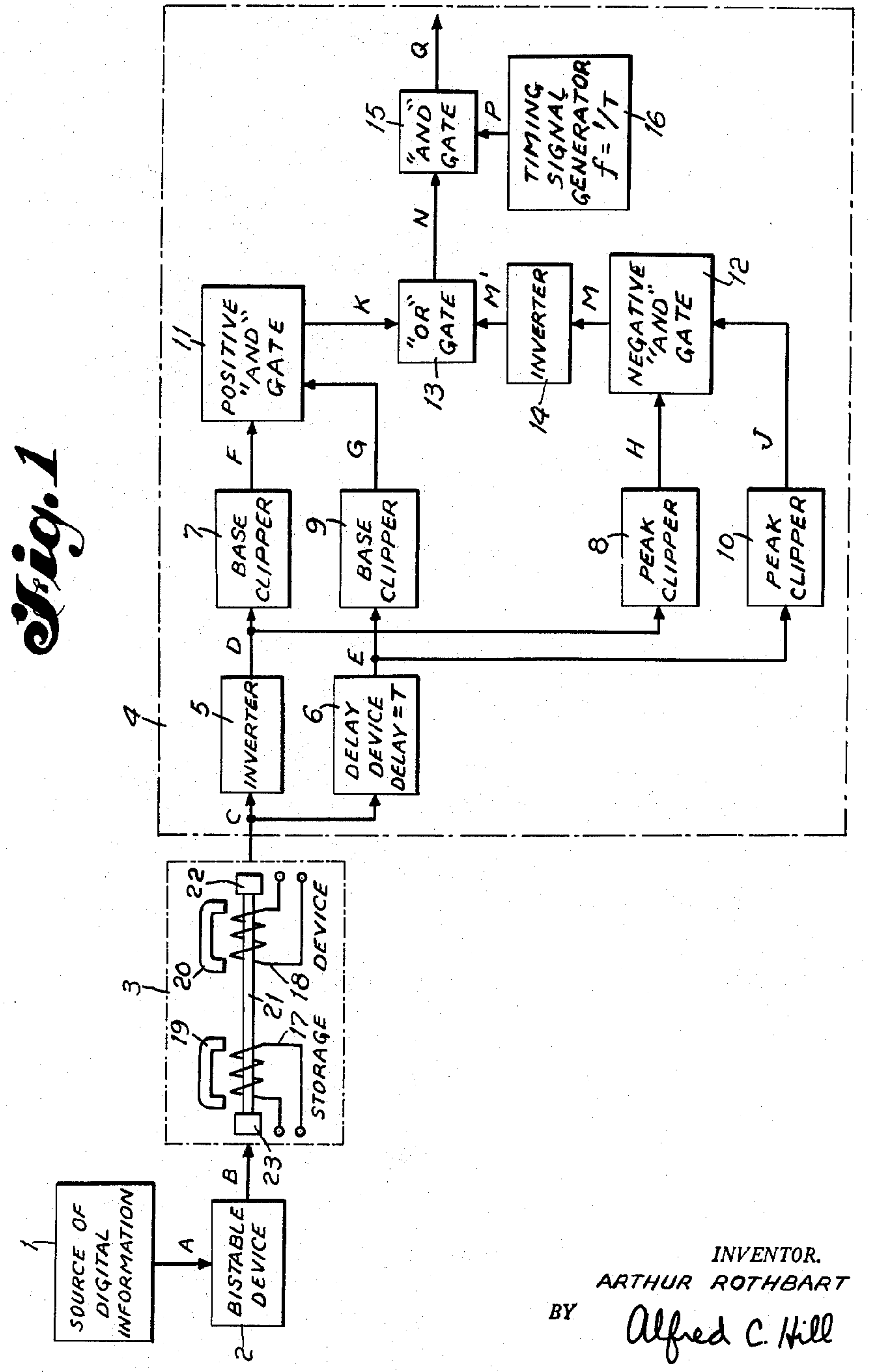

This invention relates to a signal storage system and more particularly to an improvement of certain information storage devices of the pulse type.

By far the most common and widely used pulse type information storage devices are digital information storage devices. Thus, the present invention will be described in connection with the storage of digital information. It is to be remembered, however, that the description of the storage device of this invention is not meant to restrict the storage device to storage of digital information, but may be employed in the storage of other pulse type information having characteristics equivalent to those characteristics described hereinbelow with reference to digital information.

As is well known to those skilled in the art, there are generally two techniques for representing digital information. The first technique employs binary digits in sequential, equal intervals of time. One of the conditions of a binary digit, usually indicated as a "1," is represented by the presence of a pulse within a time interval, while the other condition, usually indicated as a "0," is represented by the absence of a pulse within a time interval. In accordance with the present technique, the width of the digit pulse is maintained less than the time interval, such that a time spacing exists between adjacent digits. Since immediately following the occurrence of a pulse in a digit time interval, the amplitude level returns to zero or another predetermined reference amplitude level, this present technique is commonly referred to as the "return-to-zero" technique.

The second technique for representing digital information has several modifications. The first of these modifications represents digital information in substantially the same manner as set forth hereinabove with respect to the first technique; namely, a pulse in a time interval equals, for example, a "1" and the absence of a pulse in a time interval equals, for example a "0." The difference between the representation in the first technique and the representation in the first modification of the second technique is that there is no time spacing between adjacent digits (digit pulse width equals time interval). Thus, if adjacent digits are in the form of pulses there will result a pulse having a width equal to the sum of the time intervals of said adjacent digits with no return to a reference level between adjacent digit pulses. Thus, the first modification is referred to as the "non-return-to-zero" (NRZ) technique and represents the digital information in a manner similar to the first technique namely, the amplitude level present in a time interval of a signal having two amplitude levels.

A second modification of the second technique represents digital information on the basis of a change or no change in amplitude between two amplitude levels within a time interval rather than on the basis of an amplitude level. If the change in amplitude level represents a digit condition "1" and a constant or no change of amplitude represents a digit condition "0," the second modification is classified as a NRZ–1 technique and if the change in amplitude level represents a digit condition "0" and a constant or no change in amplitude represents a digit condition "1," the second modification is classified as a NRZ–0 technique. The instrumentation of the NRZ–0 technique is identical to the instrumentation of the NRZ–1 technique, the only difference being in the meaning of the changing and constant amplitude in much the same manner as would occur if in the first technique or first modification of the second technique if the designations of the two amplitude levels were reversed.

Certain digital storage devices require a given amount of time spacing between adjacent digits to enable the storage of the digits with acceptable resolution. Thus, said given time spacing can be considered the normal storage time interval of a digital storage device in which usually one digit is stored to maintain adjacent digits resolved. The duration of the storage time interval must be increased for those digital storage devices where a bidirectional pulse output signal is produced in response to a change in amplitude in the input signal. A typical storage device having this latter characteristic is a magnetostrictive delay line such as described in an article entitled "A Theory of Pulse Transmission Along a Magnetostrictive Delay Line," I.R.E. Transactions on Ultrasonics Engineering, PGUE–6, December 1957, pp. 32–58 jointly authored by L. Rosenberg and A. Rothbart, the present inventor. Heretofore, in digital signal storage systems employing digital storage devices having the above-mentioned characteristic, only that information represented by the "return-to-zero" technique could be stored and maintain the discrete binary digits resolved. The time spacing between adjacent digits consequently had to be equal to or larger than the time duration of the bidirectional pulse output signal related to a preceding digit in order to prevent its overlapping and interfering with the bidirectional pulse output signal, if present, related to a succeeding digit. As is well known to those familiar with the art, use of digital storage devices of the above-mentioned type have several disadvantages, the chief amongst them being the limited storage capacity of such a storage device, that is, the limited number of digits that can be stored in the storage device within a certain time interval.

It is an object of this invention to provide a signal storage system having an increased storage capacity relative to the storage capacity of the previously known signal storage systems.

Another object of this invention is to provide a digital storage system of the delay line type having a storage capacity double the storage capacity of the above-mentioned digital storage system.

A feature of this invention is the provision of means to convert information represented by the presence or absence of a pulse in at least one given time interval to a signal representing said information by a change of amplitude between two amplitude levels when said pulse is present in said given time interval and by a constant amplitude at either of said two amplitude levels when said pulse is absent from said given time interval to enable the storage of said information in a period of time equal to said given interval in a storage device having a normal storage interval equal to a period of time greater than said given time interval. An arrangement is coupled to the output of said storage device to convert said signal stored therein to said information when said signal is removed from said storage device.

Other features of this invention include the utilization of a magnetostrictive delay line having equal length input and output coils in accordance with the principles of this invention to enable the doubling of the normal storage capacity of the magnetostrictive delay line.

While the invention will be described in connection with a storage device comprising a magnetostrictive delay line apparatus, it will be understood that the principles of this invention are capable of use with any storage device having the aforementioned characteristic.

Figure 2:
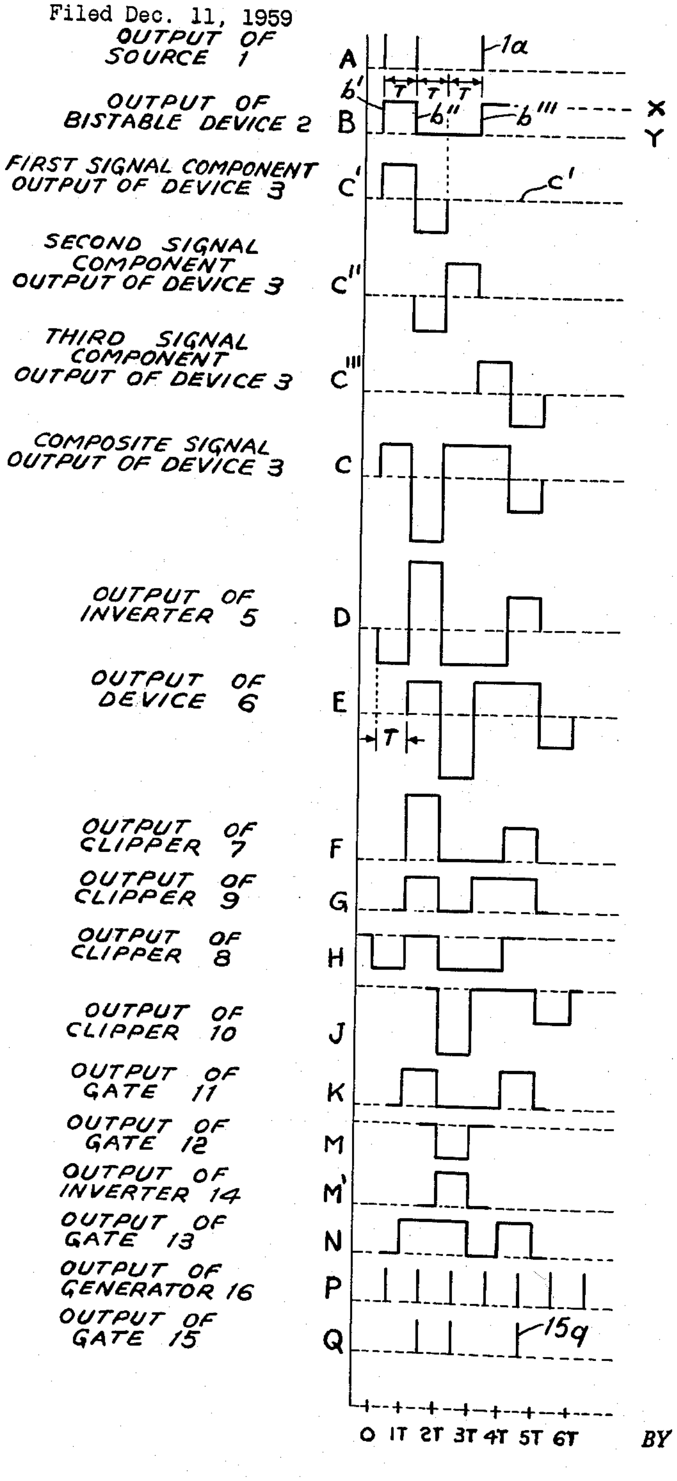

The above-mentioned and other features and objects of this invention will become more apparent by reference to the following description taken in conjunction with the accompanying drawings, in which:

FIG. 1 is a schematic diagram in block form of a digital storage system of this invention; and FIG. 2 are waveforms helpful in explaining the operation of the system of FIG. 1.

Referring to FIGS. 1 and 2, a source 1 provides information to be stored in the storage system of this invention. The information may be digital information in the form illustrated in curve A, FIG. 2. The digital information of curve A, FIG. 2, represented in accordance with the "return-to-zero" technique where the presence of a pulse 1*a* within a digit or time interval T represents a preselected condition of a binary digit, for example, "1," while the absence of a pulse represents the other digit condition, for example the "0." A means in the form of a bistable device 2 which may be a multivibrator or flip-flop circuit is coupled to the source 1 to convert the digital information of curve A, FIG. 2, to a signal employing a "non-return-to-zero" technique of information representation. As illustrated in curve B, FIG. 2, it is preferred to utilize the NRZ–1 technique, as explained hereinabove. Thus, bistable device 2 produces a signal representing the informatoin of source 1 (curve A, FIG. 2) by a change in amplitude between two amplitude levels when a pulse is present in a digit or time interval T of curve A and by a constant amplitude at either of the two amplitude levels when a pulse is absent from a time interval T of curve A. The output of device 2 is coupled to storage device 3 which has a normal storage interval equal to 2T, twice the digit time interval, T, of the information of source 1. Device 3 is that type of storage device which produces in its output a bidirectional pulse signal responsive to changes between the two amplitude levels of the output signal of device 2 (curve B, FIG. 2). A means in the form of a read-out circuit 4 is coupled to the output of device 3 to convert the bidirectional pulse output signal of device 3 to the original information of source 1 as illustrated in curve A, FIG. 2. Thus, by converting "return-to-zero" digital information to "non-return-to-zero" digital information of the NRZ–1 type for reading into the storage device and properly converting the resultant read-out signal to the original "return-to-zero" digital information, it is possible to increase the storage capacity of the storage system heretofore employed to store "return-to-zero" type digital information.

The read-out circuit 4 comprises the cooperative circuit arrangement as set forth hereinbelow. An inverter 5 and a delay device 6 having a delay time equal to the interval T are both coupled to the output of storage device 3. The output signals of inverter 5 are simultaneously fed to base clipper 7 and peak clipper 8. The output signals of electrical delay circuit 6 are similarly fed to base clipper 9 and the peak clipper 10. The base clippers 7, 9 and peak clippers 8, 10 remove respectively the base and peaks, if present, of the signals present in their individual inputs. The outputs of base clippers 7 and 9 are coupled to a first comparison means in the form of positive AND gate 11 while the outputs of peak clippers 8 and 10 are coupled to a second comparison means in the form of negative AND gate 12 to produce a signal in their respective outputs when there is time coincidence of portions of the signals appearing in their respective inputs. A gating means in the form of OR gate 13 is coupled to the output of positive AND gate 11 and inverter 14 to pass a signal whenever there is a signal coupled to its input. Inverter 14 is coupled to the output of negative AND gate 12 to invert the polarity of the output signal therefrom. The output of OR gate 13 is connected to an input of a third comparison means in the form of AND gate 15. AND gate 15 has connected to its other input timing signal generator 16 which produces a pulse train having a repetition period equal to the interval T.

Referring in greater detail to FIGS. 1 and 2, the circuit operates as follows. The "return-to-zero" types of output signal of source 1 is represented in curve A, FIG. 2. For illustration purposes, the illustrated signal is the binary number, "1101," wherein the binary condition "1" is represented by a pulse 1*a* in the digit interval and the binary condition "0" is represented by the absence of a pulse 1*a* within the digit interval T. The output signal of source 1 (curve A, FIG. 2) triggers bistable device 2 whenever a pulse 1*a* is present which causes bistable device 2 to produce a "non-return-to-zero" signal of the NRZ–1 type described above and illustrated in curve B, FIG. 2. The changes in amplitude between the two amplitude levels X and Y of curve B, FIG. 2, as indicated by $b'$, $b''$ and $b'''$ represent the time coincident pulses 1*a* of curve A, FIG. 2. As shown in the preferred embodiment, storage device 3 is of the magnetostrictive delay line type having identical transducer coils 17 and 18 cooperating with polarizing magnets 19 and 20, respectively, so as to produce a symmetrical bidirectional pulse output signal from device 3 as illustrated in curve C, FIG. 2. As the signal of curve B, FIG. 2, is impressed across the transmitting coil 17, a mechanical pulse is propagated longitudinally along the magnetostrictive rod 21 causing a change of flux linkage beneath the receiving coil 18 and producing the output signal C thereacross. The magnetostrictive rod 21 is terminated at each of its ends by dampening means 22 and 23 in a manner well known to those skilled in the art.

The signal C is a composite signal formed by the signal components illustrated in curves C′, C″ and C‴, FIG. 2 which are generated by the magnetostrictive properties of the delay line under the influence of an amplitude change at the input transducer 17. The upward change in amplitude $b'$ of curve B, FIG. 2, generates a bidirectional pulse having a positive portion and then a negative portion disposed about a reference axis as represented by the broken line as illustrated in curve C′, FIG. 2. The downward change in amplitude $b''$ of curve B, FIG. 2, produces a bidirectional pulse having a negative portion and then a positive portion disposed about a reference axis as represented by the broken line as illustrated in curve C″, FIG. 2. The signal component illustrated in curve C‴, FIG. 2, is obtained from the upward change in amplitude $b'''$ of curve B, FIG. 2, in a similar manner. The composite signal illustrated in curve C, FIG. 2, represents the superposition of the signals of curves C′, C″ and C‴, FIG. 2, with the reference axis thereof coincident. It will be noted that the period of each bidirectional pulse is equal to 2T and that the equal length transducers 17 and 18 enable a doubling of the storage capacity of the magnetostrictive delay line.

In order to obtain from device 3 the signal of source 1 it is necessary to employ circuit 4 to decode the information of the signal of curve C, FIG. 2. Read-out circuit 4 operates in the following manner. The composite signal of curve C, FIG. 2, is coupled to inverter 5 and appears as the inverted composite signal of curve D, FIG. 2. The composite signal of curve C is simultaneously fed to a delay device 6 which has a delay time equal to T and produces a delayed composite signal as illustrated in curve E, FIG. 2. The signals of curves D and E are, respectively, fed to base clippers 7 and 9 producing the respective base clipped output signals illustrated in curves F and G, FIG. 2. The signals of curves D and E are also simultaneously coupled to the peak clipper circuits 8 and 10 respectively, whose respective output signals appear as peak clipped output signals illustrated in curves H and J, FIG. 2. The signals of curves F and G are coupled to a positive AND gate 11 and when there is time coincidence between the positive peaks of curves F and G, a signal pulse as illustrated in curve K, FIG. 2, appears in the output of gate 11. Similarly, when there is coincidence between the negative pulses of the signal of curves H and J that are coupled to negative AND gate 12, a signal pulse as illustrated in curve M, FIG. 2, appears in the output of gate 12. This latter signal of curve M is inverted by the circuit 14, producing the signal of curve M′, FIG. 2. The signals of curves K and M′ are coupled to the OR gate 13 to produce a signal pulse of curve N, FIG. 2, whenever a pulse is present in either of the signals of curves K or M′. The signal of curve N of OR gate 13 is coupled to AND gate 15. Connected also to AND gate 15 is a timing signal generator 16 generating signal pulses of curves P, FIG. 2, at a frequency equal to the reciprocal of T. Whenever there is time coincidence between a pulse of the signal of curve N and a pulse of the signal of curve P, the AND gate 15 produces a pulse *15q* in the output signal of curve Q, FIG. 2. The output signal of curve Q is seen to be identical to the original digital information. It can now readily be seen that by employing the principles of this invention that information represented by conventional "return-to-zero" techniques can be stored in device 3 in one-half the amount of time normally required, and therefore, will double the digits capable of being stored in device 3 in a given amount of time.

While the waveforms are shown in ideal form it is understood that there is a finite delay between the initial signal of curve A, FIG. 2, and the final signal of curve Q, FIG. 2, other than that illustrated due to the time of storage of the signal in device 3 which has not been illustrated for the sake of clarity. It is further understood that while a magnetostrictive delay device has been shown, that one skilled in the art may readily devise a waveshaping circuit either electrical or electro-magnetic that would produce a response equivalent to the waveform of curve C, FIG. 2. Nor is it intended to limit the example to magnetostrictive delay lines to those utilizing Joule and Villari effects to effectuate a longitudinal mode of operation, but can obviously be extended, by those skilled in the art, to other modes of operation, e.g., torsional, which utilizes other effects, as for example, the Wiedemann and Guillemin effects. Furthermore, it should be obvious to those skilled in the art that each component of a pair of the bidirectional pulses are consecutive in nature due to the use of identical input and output transducers. Without departing from the scope of my invention, input and output transducers having different characteristics could be employed, resulting in a spacing between each component of a pair of the bidirectional pulses.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal storage system comprising a source of information to be stored, said information being represented by the presence or absence of a pulse in at least one given time interval, a storage device normally requiring a period of time greater than said given time interval to maintain discrete stored information resolved, means coupled to said source responsive to said information to convert said information to a signal representing said information by a change of amplitude between two amplitude levels when said pulse is present in said given time interval and by a constant amplitude at either of said two amplitude levels when said pulse is absent from said given time interval, and means to couple said signal to said storage device to reduce said period of time to said given time interval.

2. A signal storage system according to claim 1, wherein said storage device includes output means responsive to changes in amplitude of said signal to produce a bidirectional output signal disposed about a reference axis having a duration equal to said period of time.

3. A signal storage system comprising a source of information to be stored, said information being represented by the presence or absence of a pulse in at least one given time interval, a storage device normally requiring a period of time greater than said given time interval to maintain discrete stored information resolved, first conversion means coupled to said source to convert said information to a signal representing said information by a change of amplitude between two amplitude levels when said pulse is present in said given time interval and by a constant amplitude at either of said two ampliutde levels when said pulse is absent from said given time interval, means to couple said signal to said storage device to reduce said period of time to said given time interval, output means coupled to said storage device responsive to said signal to produce a composite output signal, said composite output signal including the superposition of first and second signal components, said first component being a bidirectional pulse signal disposed about a reference axis having a duration equal to said period of time produced by said change of amplitude of said signal and said second component being a constant amplitude coincident with said reference axis for a duration equal to said time interval produced by said constant amplitude of said signal, and second conversion means coupled to said output means to convert said composite output signal to said information of said source.

4. A signal storage system according to claim 3, wherein said second conversion means includes first inverter means coupled to said output means to invert said composite output signal, delay means coupled to said output means to delay said composite output signal for a time period substantially equal to said given time interval, first comparison means coupled to said first inverter means and said delay means to produce a first signal having a predetermined polarity with respect to said reference axis upon coincidence of portions of said inverted composite output signal and said delayed composite output signal, second comparison means coupled to said first inverter means said delay means to produce a second signal having a polarity opposite to said predetermined polarity upon coincidence of portions of said inverted composite output signal and said delayed composite output signal, second inverter means coupled to said second comparison means, gating means coupled to said second inverter means and said first comparison means to produce a third signal including in combination said first signal and an inverted version of said second signal, a source of reference pulses, each of said reference pulses being spaced by a period substantially equal to said given time interval, and third comparison means coupled to said reference source and said gating means to produce a fourth signal corresponding to said information of said source upon coincidence of said reference pulses and said third signal.

5. A signal storage system comprising a source of information to be stored, said information being represented in a predetermined manner by the presence or absence of a pulse in each of a plurality of equal given time intervals, a storage device normally requiring a period of time greater than one of said given time intervals to maintain discrete stored information resolved, means coupled to said source responsive to said information to convert said information sequentially to a signal representing said information by a change of amplitude between two amplitude levels when a pulse is present in said given time intervals and by a constant amplitude at either of said two amplitude levels when a pulse is absent from said given time intervals, and means to couple said signal to said storage device to reduce said period of time to one of said given time intervals.

6. A signal storage system according to claim 5, wherein said storage device includes output means responsive to changes in amplitude of said signal to produce a double ended output signal disposed about a reference axis having a duration equal to said period of time.

7. A signal storage system comprising a source of information to be stored, said information being represented in a predetermined manner by the presence or absence of a pulse in each of a plurality of equal given time intervals, a storage device normally requiring a period of time greater than one of said given time intervals to maintain discrete stored information resolved, first conversion means coupled to said source to convert said information to a signal representing said information by a change of amplitude between two amplitude levels when a pulse is present in said given time intervals and by a constant amplitude at either of said two amplitude levels when a pulse is absent from said given time intervals, means to couple said signal to said storage device to reduce said period of time to one of said given time intervals, output means coupled to said storage device responsive to said signal to produce a composite output signal, said composite output signal including the superposition of a plurality of first and second signal components, each of said first components being a bidirectional pulse signal disposed about a reference axis having a duration equal to said period of time produced by one of said changes of amplitude of said signal and each of said second components being a constant amplitude coincident with said reference axis for a duration equal to said time interval produced by one of said constant amplitude of said signal, and second conversion means coupled to said output means to convert said composite output signal to said information of said source.

8. A single storage system according to claim 7, wherein said second conversion means includes first inverter means coupled to said output means to invert said composite output signal, delay means coupled to said output means to delay said composite output signal for a time period substantially equal to one of said given time intervals, first comparison means coupled to said first inverter means and said delay means to produce a first signal having a predetermined polarity with respect to said reference axis upon coincidence of portions of said inverted composite output signal and said delayed composite output signal, second comparison means coupled to said first inverter means and said delay means to produce a second signal having a polarity opposite to said predetermined polarity upon coincidence of portions of said inverted composite output signal and said delayed composite output signal, second inverter means coupled to said second comparison means, gating means coupled to said second inverter means and said first comparison means to produce a third signal including in combination said first signal and an inverted version of said second signal, a source of reference pulses, each of said reference pulses being spaced by a period substantially equal to said given time interval, and third comparison means coupled to said reference source and said gating means to produce a fourth signal corresponding to said information of said source upon coincidence of said reference pulses and said third signal.

9. A signal storage system comprising a source of information to be stored, said information being represented in a predetermined manner by the presence or absence of a pulse in each of a plurality of equal given time intervals, a magnetostrictive delay line normally requiring a period of time greater than one of said given time intervals to maintain discrete stored information resolved, means coupled to said source responsive to said information to convert said information to a signal representing said information by a change of amplitude between two amplitude levels when a pulse is present in said given time intervals and by a constant amplitude at either of said two amplitude levels when a pulse is absent from said given time intervals, and means to couple said signal to said magnetostrictive delay line to reduce said period of time to one of said given time intervals.

10. A signal storage system according to claim 9, wherein said magneto-strictive delay line includes output means responsive to changes in amplitude of said signal to produce a bidirectional pulse output signal disposed about a reference axis having a duration equal to said period of time.

11. A signal storage system comprising a source of information to be stored, said information being represented in a predetermined manner by the presence or absence of a pulse in each of a plurality of equal given time intervals, a magnetostrictive delay line normally requiring a period of time greater than one of said given time intervals to maintain discrete stored information resolved, first conversion means coupled to said source to convert said information to a signal representing said information by a change of amplitude between two amplitude levels when a pulse is present in said given time intervals, and by a constant amplitude at either of said two amplitude levels when a pulse is absent from said given time intervals, means to couple said signal to said magnetostrictive delay line to reduce said period of time to one of said given time intervals, output means connected to said magnetostrictive delay line responsive to said signal to produce a composite output signal, said composite output signal including the superposition of a plurality of first and second signal components, each of said first components being a bidirectional pulse signal disposed about a reference axis having a duration equal to said period of time produced by one of said change of amplitude of said signal and each of said second components being a constant amplitude coincidence with said reference axis for a duration equal to said time interval produced by one of said constant amplitude of said signal, and second conversion means coupled to said output means to convert said composite output signal to said information of said source.

12. A signal storage system according to claim 11, wherein said second conversion means includes first inverter means coupled to said output means to invert said composite output signal, delay means coupled to said output means to delay said composite output signal for a time period substantially equal to one of said given time intervals, first comparison means coupled to said first inverter means and said delay means to produce a first signal having a predetermined polarity with respect to said reference axis upon coincidence of portions of said inverted composite output signal and said delayed composite output signal, second comparison means coupled to said first inverter means and said delay means to produce a second signal having a polarity opposite to said predetermined polarity upon coincidence of portions of said inverted composite output signal and said delayed composite output signal, second inverter means coupled to said second comparison means, gating means coupled to said second inverter means and said first comparison means to produce a third signal including in combination said first signal and an inverted version of said second signal, a source of reference pulses, each of said reference pulses being spaced by a period substantially equal to said given time interval, and third comparison means coupled to said reference source and said gating means to produce a fourth output signal corresponding to said information of said source upon coincidence of said reference pulses and said third signal.

13. A signal storage system according to claim 12, wherein said magnetostrictive delay line includes a magnetostrictive rod, damping means disposed about each end of said rod, a first coil winding disposed about said rod adjacent one end thereof, a second coil winding disposed about said rod adjacent to the other end thereof, and means disposed adjacent each of said coils to provide a static magnetic field linking each of said coil windings with their respective end portions of said rod, said means to couple said signal to said magnetostrictive delay line includes said first coil winding; and said output means includes said second coil winding.

14. In a signal storage system having digital information stored in a storage device in the form of a signal having a changing amplitude representing one digit condition and a constant amplitude representing the other digit condition, a read out arrangement including means to extract said stored information in the form of a composite signal including the superposition of a plurality of first and second signal components, each of said first components being a bidirectional pulse signal disposed about a reference axis having a duration equal to a given time period indicative of a changing amplitude of said stored signal, and each of said second component being a constant amplitude coincident with said reference axis for a duration equal to half said time period indicative of a constant amplitude of said stored signal, first inverter means coupled to said extraction means to invert said composite signal, delay means coupled to said extraction means to delay said composite signal for a time period substantially equal to half of said given time period, first comparison means coupled to said first inverter means and said delay means to produce a first signal having a predetermined polarity with respect to said reference axis, upon coincidence of portions of said inverted composite signal and said delayed composite signal, second comparison means coupled to said first inverter means and said delay means to produce a second signal having a polarity opposite to said predetermined polarity upon coincidence of portions of said inverted composite signal and said delayed signal, second inverter means coupled to said second comparison means, gating means coupled to said second inverter means and said first comparison means to produce a third signal including in combination said first signal and an inverted version of said second signal, a source of reference pulses, each of said reference pulses being spaced by a period substantially equal to half of said given time period, and third comparison means coupled to said reference source and said gating means to produce a fourth signal corresponding to said digital information upon coincidence of said reference pulses and said third signal.

15. A signal storage system according to claim 14, wherein said first comparison means comprises a first clipping circuit connected to said first inverter means to pass only those portions of said inverted composite signal having said predetermined polarity, a second clipping circuit connected to said delay means to pass only those portions of said delayed composite signal having said predetermined polarity, and a first AND gate coupled to said first and second clipping circuits to produce said first output signal upon coincidence of the output signals of said first and second inverted clipping circuits; second comparison means comprises a third clipping circuit connected to said first inverter means to pass only those portions of said inverted composite signal having said opposite polarity, a fourth clipping circuit connected to said delay means to pass only those portions of said delayed composite signal having said opposite polarity, and a second AND gate to produce said second signal upon coincidence of the output signals of said third and fourth clipping circuits, and said third comparison means comprises a third AND gate.

16. A signal storage system comprising a source of information to be stored, said information being represented in a predetermined manner by the presence or absence of a pulse in each of a plurality of equal given time intervals, a magnetostrictive delay line including a magnetostrictive rod requiring a normal period of time twice said given time interval to maintain discrete stored information resolved, a bistable device coupled to said source to convert said information to a signal representing said information by a change in amplitude between two amplitude levels when a pulse is present in said given time intervals and by a constant amplitude at either of said two amplitude levels when a pulse is absent from said given time intervals, damping means disposed about each end of said rod, a first coil winding disposed about one end of said rod coupled to the output of said bistable device to excite variations in said rod in accordance with said signal, a second coil winding disposed about the other end of said rod responsive to said variations in said rod to produce a composite output signal, said composite output signal including the superposition of a plurality of first and second signal components, each of said first components being a bidirectional pulse signal disposed about a reference axis having a duration equal to said period of time representative of a change of amplitude of said signal and each of said second component being a constant amplitude coincident with said reference axis for a duration equal to said time interval representative of a constant amplitude of said signal, a first polarizing magnet disposed adjacent said first winding, a second polarizing magnet disposed adjacent said second winding, each of said polarizing magnets linking their respective windings with the respective end portions of said rod, a first inverter coupled to said second coil winding to invert said composite signal, delay means coupled to said second coil winding to delay said composite signal for a time period substantially equal to said given time interval, a first clipping circuit connected to said first inverter means to pass only those portions of said inverted composite signal having a predetermined polarity with respect to said reference axis, a second clipping means connected to said delay means to pass only those portions of said delayed composite signal having said predetermined polarity, a third clipping circuit connected to said first inverter means to pass only those portions of said inverted composite signal having a polarity opposite to said predetermined polarity, a fourth clipping circuit connected to said delay means to pass only those portions of said delayed composite signal having said opposite polarity, a first AND gate coupled to said first and second clipping circuits to produce a first signal upon coincidence of said predetermined polarity portions of said inverted composite signal and said delayed composite signal, a second AND gate coupled to said third and fourth clipping circuits to produce a second signal upon coincidence of said opposite polarity portions of said inverted composite signal and said delayed composite signal, second inverter means coupled to said second AND gate, an OR gate coupled to said first AND gate and said second inverter to produce a third signal including in combination said first signal and an inverted version of said second signal, a source of reference pulses, each of said reference pulses being spaced by a period substantially equal to said given time interval, a third AND gate coupled to said reference source and said OR gate to produce a fourth signal corresponding to said information of said source upon coincidence of said reference pulses and said third signal.

References Cited in the file of this patent

UNITED STATES PATENTS

| | | |
|---|---|---|
| 2,401,094 | Nicholson | May 28, 1946 |
| 2,659,049 | Grieg et al. | Nov. 10, 1953 |
| 2,700,155 | Clayden | Jan. 18, 1955 |
| 2,700,696 | Barker | Jan. 25, 1955 |
| 2,912,684 | Steele | Nov. 10, 1959 |
| 2,946,968 | Faulkner | July 26, 1960 |
| 2,992,411 | Abbott | July 11, 1961 |

OTHER REFERENCES

Electrical Communication, March 1951, pages 46–53, by Bradburd.